(12) United States Patent
Li (10) Patent No.: US 12,098,815 B2
(45) Date of Patent: Sep. 24, 2024

(54) HEADLAMP LIGHT-SENSING DETECTION DEVICE, AND HEADLAMP

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 18/309,574

(22) Filed: Apr. 28, 2023

(65) Prior Publication Data
US 2024/0271769 A1   Aug. 15, 2024

(30) Foreign Application Priority Data

Feb. 15, 2023   (CN) .......................... 202320242122.6

(51) Int. Cl.
| | |
|---|---|
| B60Q 1/00 | (2006.01) |
| F21S 41/143 | (2018.01) |
| F21S 41/27 | (2018.01) |
| F21S 41/65 | (2018.01) |
| F21V 23/04 | (2006.01) |
| F21V 31/00 | (2006.01) |

(52) U.S. Cl.
CPC ............. *F21S 41/27* (2018.01); *F21S 41/143* (2018.01); *F21S 41/65* (2018.01); *F21V 23/0464* (2013.01); *F21V 31/005* (2013.01)

(58) Field of Classification Search
CPC .......... F21S 41/27; F21S 41/143; F21S 41/65; F21V 23/0464; F21V 31/005
See application file for complete search history.

(56) References Cited

U.S. PATENT DOCUMENTS

2008/0062706 A1* 3/2008 Feldmeier ............... F21S 41/14
340/468

FOREIGN PATENT DOCUMENTS

CN         213577205 U   *   6/2021

OTHER PUBLICATIONS

CN-213577205 U (Year: 2021).*

* cited by examiner

*Primary Examiner* — Elmito Breval
(74) *Attorney, Agent, or Firm* — Westbridge IP LLC (57) ABSTRACT

Disclosed are a headlamp light-sensing detection device and a headlamp. The headlamp light-sensing detection device includes a condensing lens, a lens hood and a light-sensing element. The condensing lens is arranged in front of the light-sensing element, to converge external light to the light-sensing element. The lens hood is arranged between the light-sensing element and the condensing lens, and may be configured to shield the light which is projected to the light-sensing element by a high beam light source and a low beam light source, so as to reduce optical crosstalk, such that external ambient light is received accurately, thereby achieving a desirable light-sensing detection effect. The light-sensing element may provide photoelectric parameters according to the brightness of sensed light, and then an MCU chip collects the photoelectric parameters and provides a corresponding control signal.

15 Claims, 5 Drawing Sheets

HEADLAMP LIGHT-SENSING DETECTION DEVICE, AND HEADLAMP

CROSS-REFERENCE TO RELATED APPLICATIONS

This application claims priority to Chinese Patent Application No. 202320242122.6, filed on Feb. 15, 2023, the content of which is incorporated herein by reference in its entirety.

TECHNICAL FIELD

The present application relates to the technical field of headlamps, and specifically, to a headlamp light-sensing detection device, and a headlamp.

BACKGROUND

In a current headlamp, a plurality of brightness gears are usually designed. In an environment where a user uses the headlamp, there are various obstacles with different distances and reflectivity. If the user has been turned on a low brightness gear, in open scenes or scenes with low reflectivity, the user will not feel bright enough and may not be able to see clearly. If the user has been turned on a high brightness gear, in narrow scenes or scenes with high reflectivity, the user will feel very dazzling, or even threaten his/her safety, such that the user may need to frequently switch gears to adapt changes in scenes.

Therefore, there is indeed a need for an automatic adjustment function of headlamp brightness. The automatic brightness adjustment function of the current headlamp is implemented generally by depending on a light-sensing element for sensing the light intensity of an environment. However, a lens for collecting reflected light is arranged independent of a main lens. Since the main lens and the lens for collecting light are separately arranged, the current headlamp is complex in entire structure and not easy to assemble.

A patent document with Application Publication No. CN 115183166 A discloses a mobile lighting apparatus with automatic dimming. By means of arranging a lens for converging external entering light, then using optical fiber to receive light from the lens and guiding the external entering light to a light-sensing receiver, the light-sensing receiver may transmit a signal to a driving plate, so as to control the increasing and reducing of light-emitting brightness of a light-emitting unit. By means of the patent application, the lens receiving ambient light is integrated with a main lens. Although the structure is simplified, there are still problems with optical crosstalk. It can be seen that, there are still some defects in the related art, and it is necessary to make further improvements to the related art.

SUMMARY

The present application provides a headlamp light-sensing detection device, to solve the problems that a headlamp is complex in structure and not easy to assemble and there is optical crosstalk in the related art.

In order to implement the above objective, the present application uses the following technical solutions.

A headlamp light-sensing detection device includes a condensing lens, a lens hood and a light-sensing element. The condensing lens is arranged in front of the light-sensing element, and is configured to converge external light to the light-sensing element. The lens hood is arranged between the light-sensing element and the condensing lens, and is configured to shield an internal light source from irradiating to the light-sensing element, so as to reduce optical crosstalk. The light-sensing element is configured to provide, according to the brightness of sensed light, a corresponding signal for controlling the increasing and reducing of light-emitting brightness of a headlamp.

Further, the light-sensing element is arranged on a Printed Circuit Board (PCB), and a Micro Control Unit (MCU) chip is mounted on the PCB. The PCB supplies power to the light-sensing element and the MCU chip. The PCB is capable of carrying signal transmission between the light-sensing element and the MCU chip. The PCB is further capable of outputting a control signal of the MCU chip.

Further, the condensing lens is integrated on a first lens; and the condensing lens is of a convex lens structure.

The first lens is configured to diffuse light of a high beam light source and a low beam light source in the headlamp.

Further, the headlamp light-sensing detection device further includes a housing with a recessed cavity, the lens hood and a lamp panel. A first lens and the housing are detachably connected to coat the lamp panel and the lens hood in the recessed cavity.

The PCB is mounted on the side of the housing that is away from the first lens; and the housing is arranged between the PCB and the first lens.

Further, the lamp panel is provided with a first light hole; the surface of the recessed cavity of the housing is provided with a second light hole. The first light hole, the second light hole and the light-sensing element are all aligned with the condensing lens.

Further, one end of the lens hood is in contact with and aligned with the condensing lens, and a gasket is arranged between the other end of the lens hood and the lamp panel. The gasket and the first light hole are arranged in an aligned manner.

Further, the lamp panel is provided with a high beam light source and a low beam light source. The lamp panel supplies power to the high beam light source and the low beam light source, and is capable of transmitting the signal for controlling the increasing and reducing of the light-emitting brightness to the high beam light source and the low beam light source.

Further, the lamp panel is electrically connected to the PCB, so as to transmit a current and the control signal.

Further, the light-sensing element has a discontinuous multi-stage triggering threshold. For received light, when the brightness of the light reaches a stage triggering threshold each time, different fixed photoelectric parameters are generated. The MCU chip provides a corresponding fixed control signal by means of collecting the fixed photoelectric parameters of the light-sensing element.

Further, the light-sensing element has a triggering threshold. For received light, after the brightness of the light reaches the triggering threshold, the light-sensing element performs steplessly adjustment in real time according to the brightness of the received light, and provides real-time photoelectric parameters. The MCU chip provides a corresponding continuous control signal by means of collecting the real-time photoelectric parameters of the light-sensing element.

A headlamp includes a first lens, a condensing lens, a lens hood, a lamp panel, a housing and a PCB.

The condensing lens is integrally formed with the first lens.

The lamp panel is provided with a high beam light source and a low beam light source. The first lens is configured to diffuse light of the high beam light source and the low beam light source. The lamp panel is provided with a first light hole.

The housing is provided with a recessed cavity. The recessed cavity is configured to accommodate the first lens, the lens hood and the lamp panel. The housing is provided with a second light hole.

The PCB is provided with a light-sensing element. The condensing lens is configured to converge external light to the light-sensing element. The light-sensing element is configured to provide, according to the intensity of sensed light, a corresponding signal for controlling the increasing and reducing of light-emitting brightness of a headlamp. The first lens, the lens hood and the lamp panel are arranged on one side of the housing. The PCB is arranged on the other side of the housing.

The lens hood is arranged between the condensing lens and the lamp panel. The condensing lens, the lens hood, the first light hole, the second light hole and the light-sensing element are arranged in an aligned manner. After being gathered by the condensing lens, the external light successively passes through the lens hood, the first light hole and the second light hole, and is finally projected to the light-sensing element. The lens hood is configured to shield the light which is projected to the light-sensing element by the high beam light source and the low beam light source.

Further, the first lens is provided with a mounting groove that allows the lens hood to be embedded. The mounting groove is configured to ensure that the condensing lens and the lens hood are arranged in an aligned manner. Further, a gasket is arranged between the lens hood and the lamp panel.

Further, each of two sides of the lamp panel is provided with a positioning hole. The side of the first lens that faces the lamp panel is provided with two positioning pins. The two positioning pins correspond to the positioning holes on a one-to-one base. The positioning pins are inserted into the positioning holes, so as to realize the aligned arrangement between the condensing lens and the first light hole.

Further, the side of the first lens that faces the lamp panel is provided with four mounting columns. The mounting columns are provided with internal threaded holes. The housing is provided with four through holes. The PCB is provided with four mounting holes. The four mounting columns, the four through holes and the four mounting holes are in one-to-one correspondence. Bolts first penetrate the mounting holes and the through holes, and then are locked in the internal threaded holes of the mounting columns, so as to achieve a detachable connection between the PCB and the first lens, and fix the first lens, the lens hood and the lamp panel in the recessed cavity of the housing.

Further, four buffer rings are arranged between the housing and the PCB. The four buffer rings and the four mounting holes are arranged in one-to-one correspondence and arranged in an aligned manner.

In the present application, by means of arranging the special light-sensing element to cooperate with the condensing lens to receive the ambient light outside the headlamp, the brightness of the light source of the headlamp is flexibly adjusted, such that the headlamp may intelligently and automatically adjust the brightness according to service environment. Therefore, electric power may be better saved while the practicability is improved, and the light source of the headlamp is prevented from being in a high-brightness working state for a long time, thereby prolonging the service life of the headlamp, and avoiding hidden danger. The structure is relatively concise and compact in design, and is superior in assembly and waterproofing. The lens hood is arranged and may be configured to shield the light which is projected to the light-sensing element by the high beam light source and the low beam light source, so as to reduce optical crosstalk, such that external ambient light is received accurately, thereby achieving a desirable light-sensing detection effect.

DETAILED DESCRIPTION OF THE EMBODIMENTS

In order to make objectives, technical solutions, and advantages of the present application clearer, the technical solutions of the present application will be clearly and completely described below with reference to the embodiments of the present application. It is to be noted that the described embodiments are only part of the embodiments of the present application, not all the embodiments. Based on the embodiments in the present application, all other embodiments obtained by those of ordinary skill in the art without creative work shall fall within the protection scope of the present application.

The term "and/or" in the embodiments of this application is merely an association relationship describing related objects, which means that there may be three relationships, for example, A and/or B may indicate three cases: A exists alone, A and B exist simultaneously, and B exists alone.

The terms "first" and "second" are used for descriptive purposes only and are not to be construed as indicating or implying relative importance or implicitly specifying the number of technical features indicated. Therefore, features delimited with "first" or "second" may expressly or implicitly include at least one of that feature. In the description of the present application, terms "include" and "have" and any variations thereof are intended to cover non-exclusive inclusions. For example, it is not limited for systems, products or devices including a series of components or units to listed components or units, and other components or units which are not listed or are inherent to these products or devices may be included instead. In the description of the present application, "a plurality of" means at least two, for example, two, three, or the like, unless otherwise explicitly specified.

References to "embodiments" here mean that particular features, structures or characteristics described in combination with the embodiments may be included in at least one embodiment of the present application. The presence of the phrase in various positions in the specification does not necessarily mean the same embodiment, nor is it a separate or alternative embodiment that is mutually exclusive with other embodiments. It is understood, both explicitly and implicitly, by those skilled in the art that the embodiments described here may be combined with other embodiments.

Figure 1:
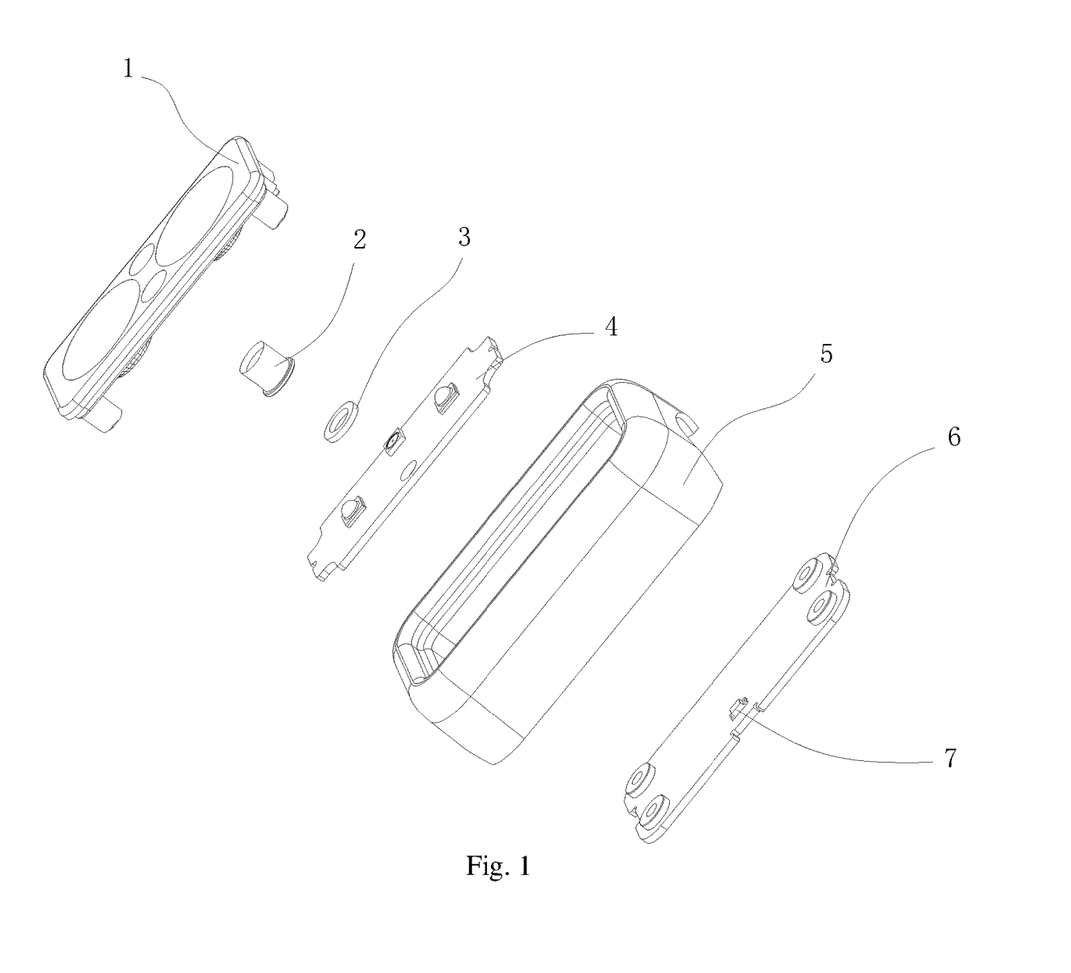
FIG. 1 is a schematic layout diagram of a headlamp light-sensing detection device in a headlamp according to the present application.

The present application provides a headlamp light-sensing detection device. As shown in FIG. 1, the device implementing light-sensing detection includes a first lens 1, a lens hood 2 and a light-sensing element 7. In a specific embodiment of the present application, a headlamp suitable for the light-sensing detection device further includes other components, which are the lens hood 2, a gasket 3, a lamp panel 4, a housing 5 and a PCB 6. The gasket 3 is arranged between the lens hood 2 and the lamp panel 4. The first lens 1 and the housing 5 cover the lens hood 2, the gasket 3 and the lamp panel 4. The light-sensing element 7 is fixedly mounted on the PCB 6, and an MCU chip responsible for processing data of the light-sensing element 7 is further mounted on the PCB. The PCB 6 is mounted at the rear part of the housing 5. The above components jointly form a headlamp with a light-sensing detection function and capable of adaptively adjusting brightness.

Figure 2:
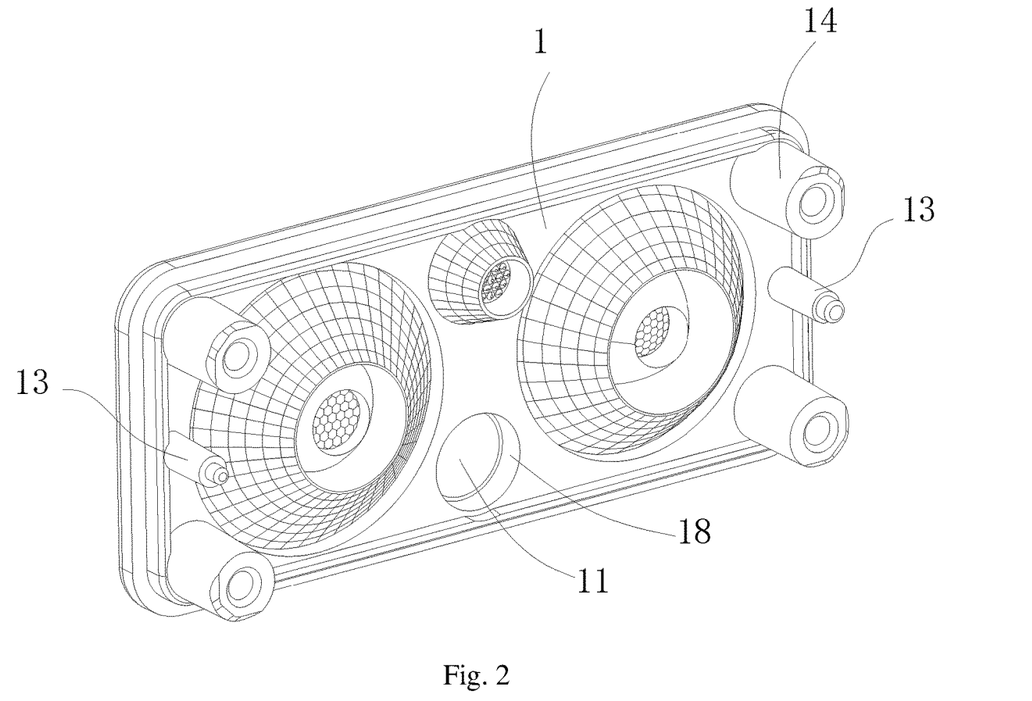
FIG. 2 is a schematic diagram of the back side of a first lens.

FIG. 2 shows a back-side structure of the lens 1. The back side of the first lens 1 is designed with functional partitions with different surface shapes, including a condensing lens 11 for receiving external light, gathering the light and conducting the light backwards. Through the integral design of the first lens 1, the present application is convenient in assembling and more compact in connection.

Figure 3:
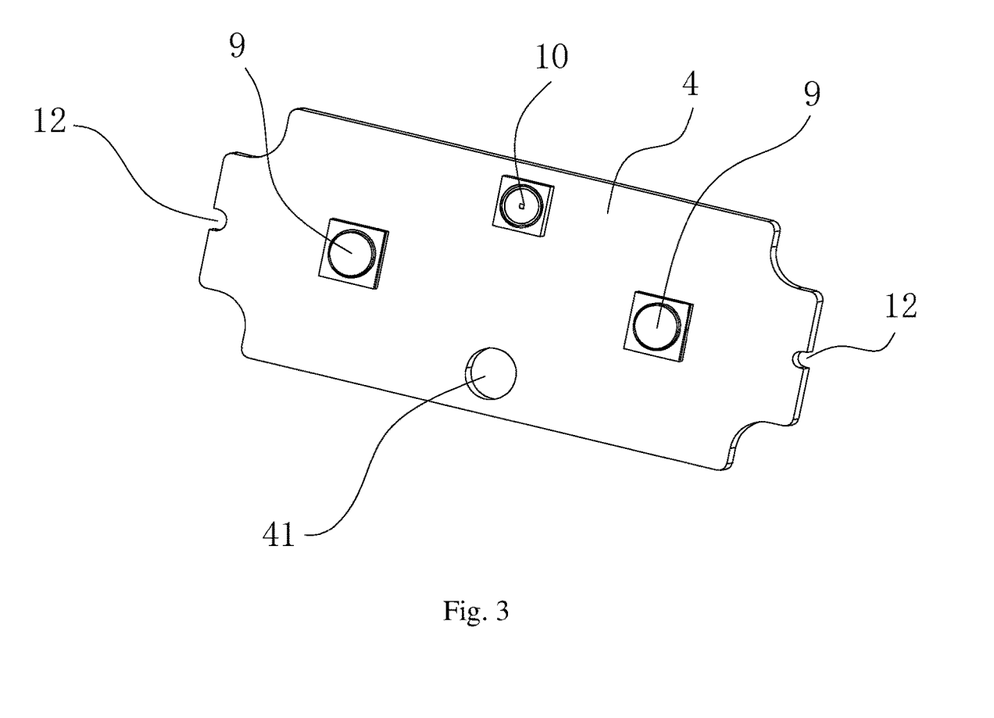
FIG. 3 is a schematic structural diagram of a lamp panel.

The structure of the lamp panel 4 is shown in FIG. 3. A high beam light source 9 and a low beam light source 10 may be mounted on the surface of the lamp panel. The lamp panel 4 may supply power to light sources mounted on the lamp panel, and transmit a control signal. The middle part on the lower end of the lamp panel 4 is provided with a first light hole 41, so as to provide a channel for the entering of external light.

Figure 4:
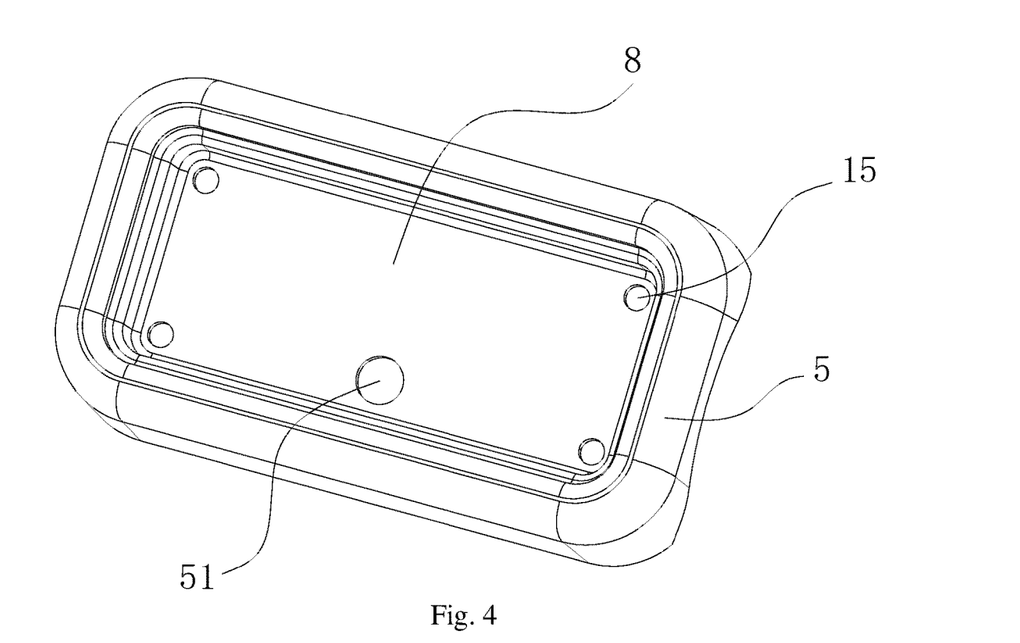
FIG. 4 is a schematic structural diagram of a housing.

The structure of the housing 5 is shown in FIG. 4. The upper surface of the housing recesses inwards, so as to left a recessed cavity 8 for mounting other components. The middle part on one end of the upper surface is provided with a second light hole 51 for providing a passage for the entering of the external light.

Figure 5:
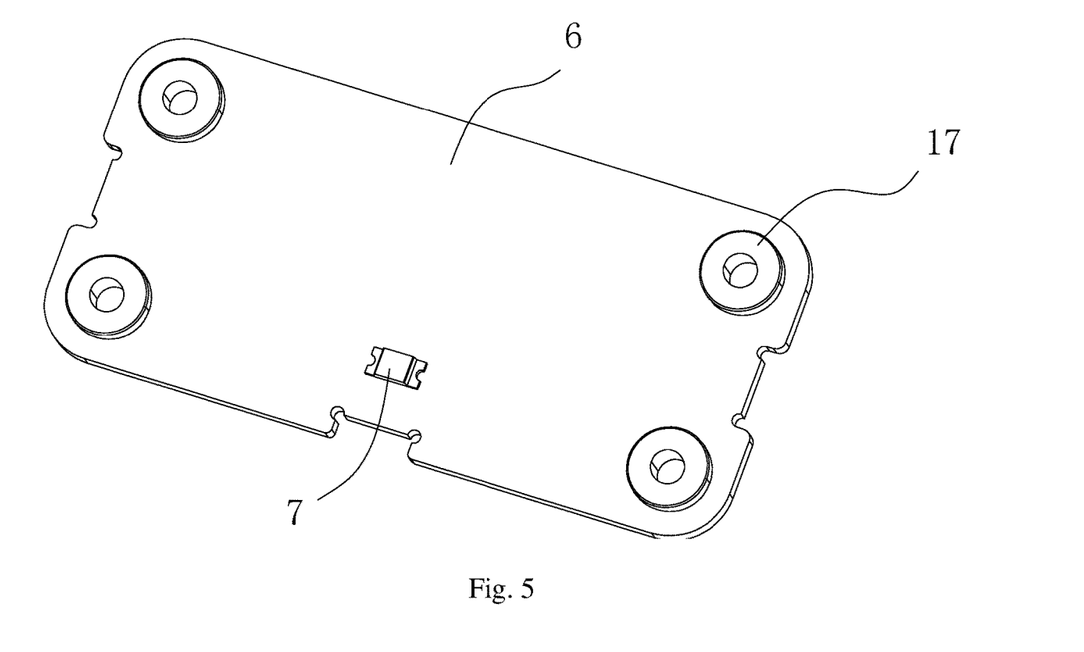
FIG. 5 is a schematic diagram of a mounting position of a light-sensing element.

As shown in FIG. 5, the light-sensing element 7 is fixedly mounted at the middle part on the lower end of the PCB 6. The light-sensing element 7 may send, according to the intensity of sensed light, a corresponding control signal via the MCU chip for brightness adjustment. In a specific embodiment of the present application, the MCU chip senses ambient light by means of the light-sensing element 7, subtract sensed light intensity data from photoelectric data of integral lens refraction and light guide interference, and convert into a threshold at different stages, so as to output different fixed brightness control signals. In another specific embodiment of the present application, the MCU chip senses the ambient light by means of the light-sensing element 7 and is set with a particular triggering threshold; when the sensed light intensity exceeds the threshold, the MCU chip starts to adjust, and then performs steplessly adjustment by reading corresponding photoelectric data of the light-sensing element 7, then subtracting the data of integral lens refraction and light guide interference, and combining a light intensity control algorithm to output a continuous control signal.

In a specific headlamp, as shown in FIG. 1, including the headlamp light-sensing detection device of the present application, the condensing lens 11 of the first lens 1, the first light hole 41 of the lamp panel 4, the second light hole 51 of the housing 5, and the light-sensing element 7 mounted on the PCB 6 are aligned in position. The external light is first gathered via the condensing lens 11 and then transmitted to the light-sensing element 7. The control signal provided by the light-sensing element 7 is transmitted to the lamp panel 4 via the PCB 6, so as to control the brightness of a light source on the lamp panel 4. The lens hood 2 may shield the influence of the light source on the lamp panel 4, so as to make the control of the light-sensing element more accurate.

In the present application, by means of arranging the special light-sensing element to cooperate with a light transmission portion to receive the ambient light outside the headlamp, the brightness of the light source of the headlamp is flexibly adjusted, such that the headlamp may intelligently and automatically adjust the brightness according to service environment. Therefore, electric power may be better saved while the practicability is improved, and the light source of the headlamp is prevented from being in a high-brightness working state for a long time, thereby prolonging the service life of the headlamp, and avoiding hidden danger. The structure is relatively concise and compact in design, and is superior in assembly and waterproofing. The lens hood is arranged and may be configured to shield the light which is projected to the light-sensing element by the high beam light source and the low beam light source, so as to reduce optical crosstalk, such that external ambient light is received accurately, thereby achieving a desirable light-sensing detection effect.

Figure 6:
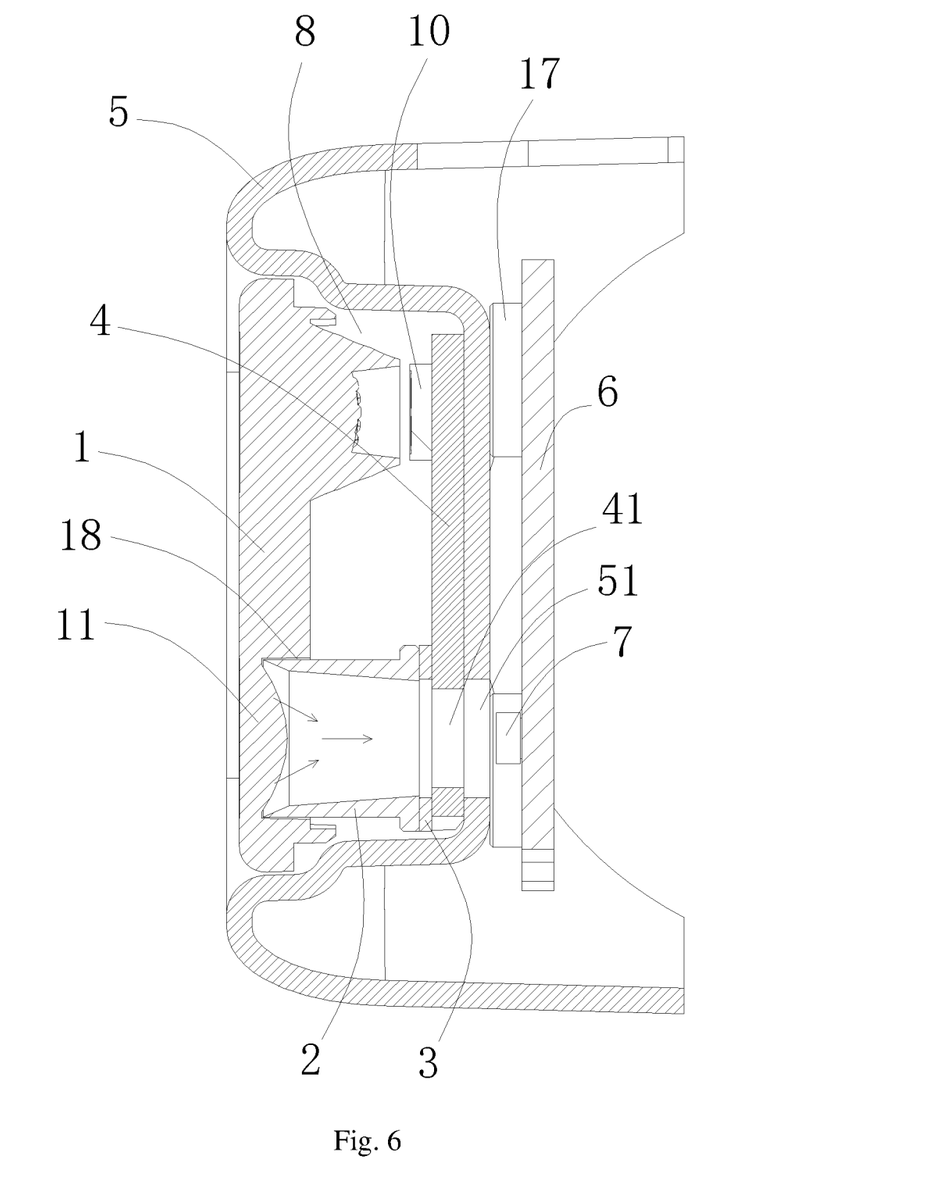
FIG. 6 is a cross-sectional view of a headlamp.

As shown in FIG. 2 and FIG. 6, the first lens 1 is provided with a mounting groove 18 that allows the lens hood to be embedded. The mounting groove 18 is configured to ensure that the condensing lens 11 and the lens hood 2 are arranged in an aligned manner, such that the external light may be prevented from leaking after the light is gathered by the condensing lens 11.

As shown in FIG. 6, a gasket 3 is arranged between the lens hood 2 and the lamp panel 4. The gasket 3 is configured to prevent the external light from leaking after being guided by the lens hood 2.

Figure 7:
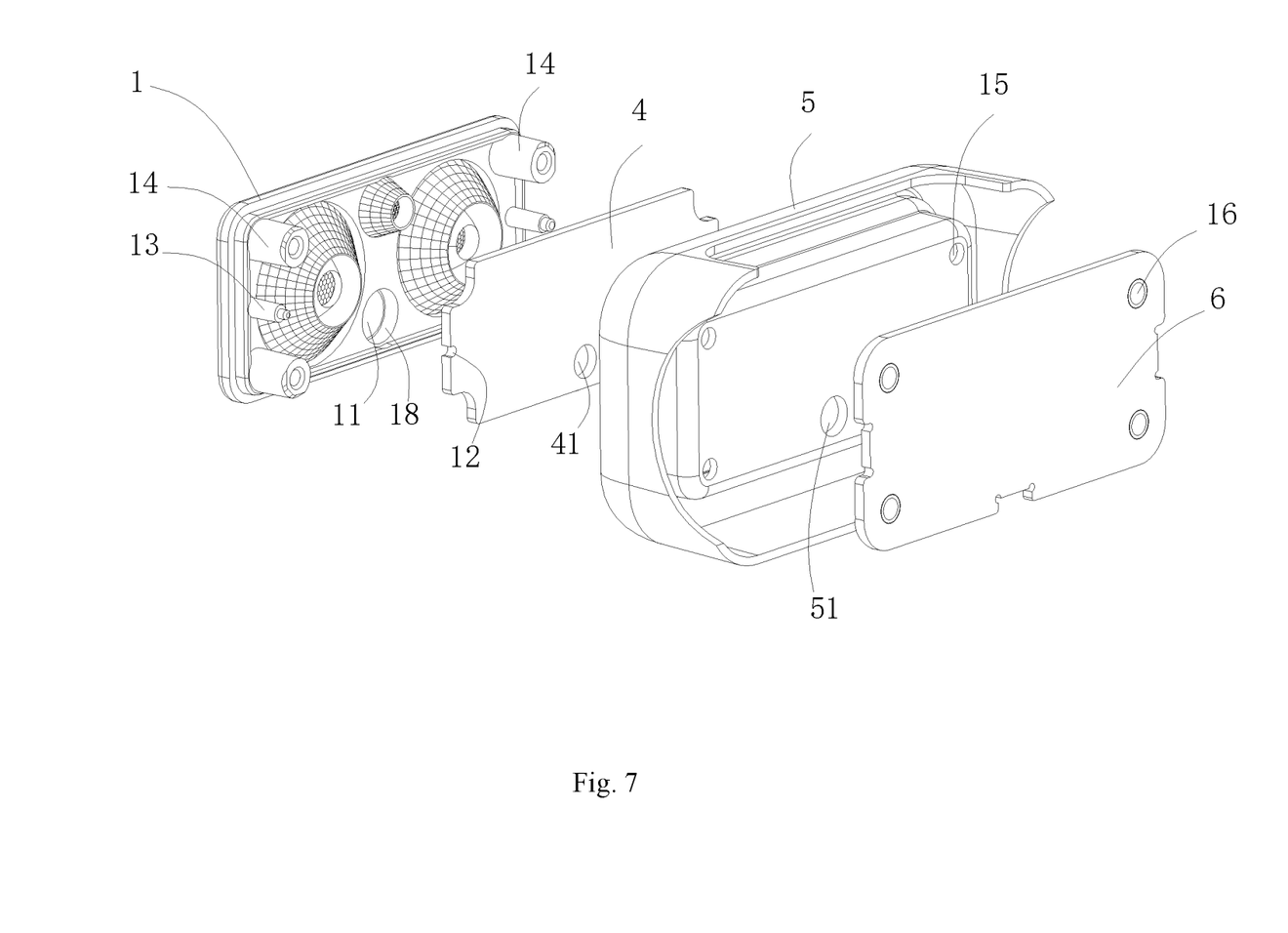
FIG. 7 is an explosive view of a headlamp.

As shown in FIG. 2, FIG. 6 and FIG. 7, each of two sides of the lamp panel 4 is provided with a positioning hole 12. The side of the first lens 1 that faces the lamp panel 4 is provided with two positioning pins 13. The two positioning pins 13 correspond to the positioning holes 12 on a one-to-one base. The positioning pins 13 are inserted into the positioning holes 12, so as to realize the aligned arrangement between the condensing lens 11 and the first light hole 41. The side of the first lens 1 that faces the lamp panel 4 is provided with four mounting columns 14. The mounting columns 14 are provided with internal threaded holes. The housing is provided with four through holes 15. The PCB is provided with four mounting holes 16. The four mounting columns 14, the four through holes 15 and the four mounting holes 16 are in one-to-one correspondence. Bolts first penetrate the mounting holes 16 and the through holes 15, and then are locked in the internal threaded holes 14 of the mounting columns, so as to achieve a detachable connection between the PCB 6 and the first lens 1, and fix the first lens 1, the lens hood 2 and the lamp panel 4 in the recessed cavity 8 of the housing 5.

Four buffer rings 17 are arranged between the housing 5 and the PCB 6. The four buffer rings 17 and the four mounting holes 16 are arranged in one-to-one correspondence and arranged in an aligned manner.

Finally, it should be noted that, the above embodiments are merely for describing and not intended to limit the technical solutions of the present application. Although the disclosure has been described in detail with reference to the above embodiments, those of ordinary skill in the art should understand that, they may still make modifications to the technical solutions recited in the above embodiments or make equivalent replacements to a part of the technical features thereof; and the modifications or replacements do not cause essence of the corresponding technical solutions to depart from the spirit and scope of the technical solutions of the embodiments of the present application.

What is claimed is:

1. A headlamp light-sensing detection device, comprising a condensing lens, a lens hood and a light-sensing element, wherein the condensing lens is arranged in front of the light-sensing element, and is configured to converge external light to the light-sensing element; the lens hood is arranged between the light-sensing element and the condensing lens, and is configured to shield an internal light source from irradiating to the light-sensing element, so as to reduce optical crosstalk; and the light-sensing element is configured to provide, according to the brightness of sensed light, a corresponding signal for controlling the increasing and reducing of light-emitting brightness of a headlamp, wherein the headlamp light-sensing detection device further comprises a housing with a recessed cavity, the lens hood and a lamp panel, wherein a first lens and the housing are detachably connected to coat the lamp panel and the lens hood in the recessed cavity; the PCB is mounted on the side of the housing that is away from the first lens; and the housing is arranged between the PCB and the first lens.

2. The headlamp light-sensing detection device as claimed in claim 1, wherein the light-sensing element is arranged on a Printed Circuit Board (PCB), and a Micro Control Unit (MCU) chip is mounted on the PCB: the PCB supplies power to the light-sensing element and the MCU chip: the PCB is capable of carrying signal transmission between the light-sensing element and the MCU chip; and the PCB is further capable of outputting a control signal of the MCU chip.

3. The headlamp light-sensing detection device as claimed in claim 1, wherein the condensing lens is integrated on a first lens: the condensing lens is of a convex lens structure; and the first lens is configured to diffuse light of a high beam light source and a low beam light source in the headlamp.

4. The headlamp light-sensing detection device as claimed in claim 1, wherein the lamp panel is provided with a first light hole: the surface of the recessed cavity of the housing is provided with a second light hole; and the first light hole, the second light hole and the light-sensing element are all aligned with the condensing lens.

5. The headlamp light-sensing detection device as claimed in claim 1, wherein one end of the lens hood is in contact with and aligned with the condensing lens, and a gasket is arranged between the other end of the lens hood and the lamp panel; and the gasket and the first light hole are arranged in an aligned manner.

6. The headlamp light-sensing detection device as claimed in claim 1, wherein the lamp panel is provided with a high beam light source and a low beam light source; and the lamp panel supplies power to the high beam light source and the low beam light source, and is capable of transmitting the signal for controlling the increasing and reducing of the light-emitting brightness to the high beam light source and the low beam light source.

7. The headlamp light-sensing detection device as claimed in claim 1, wherein the lamp panel is connected to the PCB, so as to transmit a current and the control signal.

8. The headlamp light-sensing detection device as claimed in claim 1, wherein the light-sensing element has a discontinuous multi-stage triggering threshold: for received light, when the brightness of the light reaches a stage triggering threshold each time, different fixed photoelectric parameters are generated; and the MCU chip provides a corresponding fixed control signal by means of collecting the fixed photoelectric parameters of the light-sensing element.

9. The headlamp light-sensing detection device as claimed in claim 1, wherein the light-sensing element has a triggering threshold: for received light, after the brightness of the light reaches the triggering threshold, the light-sensing element performs steplessly adjustment in real time according to the brightness of the received light, and provides real-time photoelectric parameters; and the MCU chip provides a corresponding continuous control signal by means of collecting the real-time photoelectric parameters of the light-sensing element.

10. A headlamp, comprising:
a first lens;
a condensing lens, integrally formed with the first lens;
a lens hood:
a lamp panel, provided with a high beam light source and a low beam light source, wherein the first lens is configured to diffuse light of the high beam light source and the low beam light source, and the lamp panel is provided with a first light hole;
a housing, provided with a recessed cavity, wherein the recessed cavity is configured to accommodate the first lens, the lens hood and the lamp panel, and the housing is provided with a second light hole; and
a PCB, provided with a light-sensing element, wherein the condensing lens is configured to converge external light to the light-sensing element, the light-sensing element is configured to provide, according to the intensity of sensed light, a corresponding signal for controlling the increasing and reducing of light-emitting brightness of a headlamp, the first lens, the lens hood and the lamp panel are arranged on one side of the housing, and the PCB is arranged on the other side of the housing;
wherein the lens hood is arranged between the condensing lens and the lamp panel; the condensing lens, the lens hood, the first light hole, the second light hole and the light-sensing element are arranged in an aligned manner; after being gathered by the condensing lens, the external light successively passes through the lens hood, the first light hole and the second light hole, and is finally projected to the light-sensing element; and the lens hood is configured to shield the light which is projected to the light-sensing element by the high beam light source and the low beam light source.

11. The headlamp as claimed in claim 10, wherein the first lens is provided with a mounting groove that allows the lens hood to be embedded; and the mounting groove is configured to ensure that the condensing lens and the lens hood are arranged in an aligned manner.

12. The headlamp as claimed in claim 10, wherein a gasket is arranged between the lens hood and the lamp panel.

13. The headlamp as claimed in claim 10, wherein each of two sides of the lamp panel is provided with a positioning hole; the side of the first lens that faces the lamp panel is provided with two positioning pins: the two positioning pins correspond to the positioning holes on a one-to-one base; and the positioning pins are inserted into the positioning holes, so as to realize the aligned arrangement between the condensing lens and the first light hole.

14. The headlamp as claimed in claim 10, wherein the side of the first lens that faces the lamp panel is provided with four mounting columns; the mounting columns are provided with internal threaded holes; the housing is provided with four through holes; the PCB is provided with four mounting holes; the four mounting columns, the four through holes and the four mounting holes are in one-to-one correspondence; and bolts first penetrate the mounting holes and the through holes, and then are locked in the internal threaded holes of the mounting columns, so as to achieve a detachable connection between the PCB and the first lens, and fix the first lens, the lens hood and the lamp panel in the recessed cavity of the housing.

15. The headlamp as claimed in claim 10, wherein four buffer rings are arranged between the housing and the PCB; and the four buffer rings and the four mounting holes are arranged in one-to-one correspondence and arranged in an aligned manner.

* * * * *